Patented Aug. 12, 1941

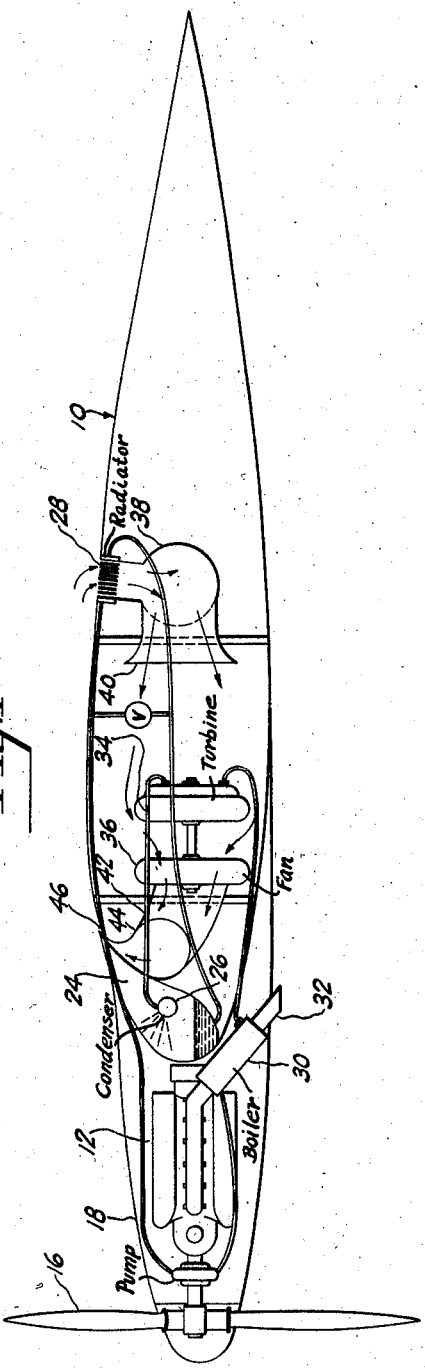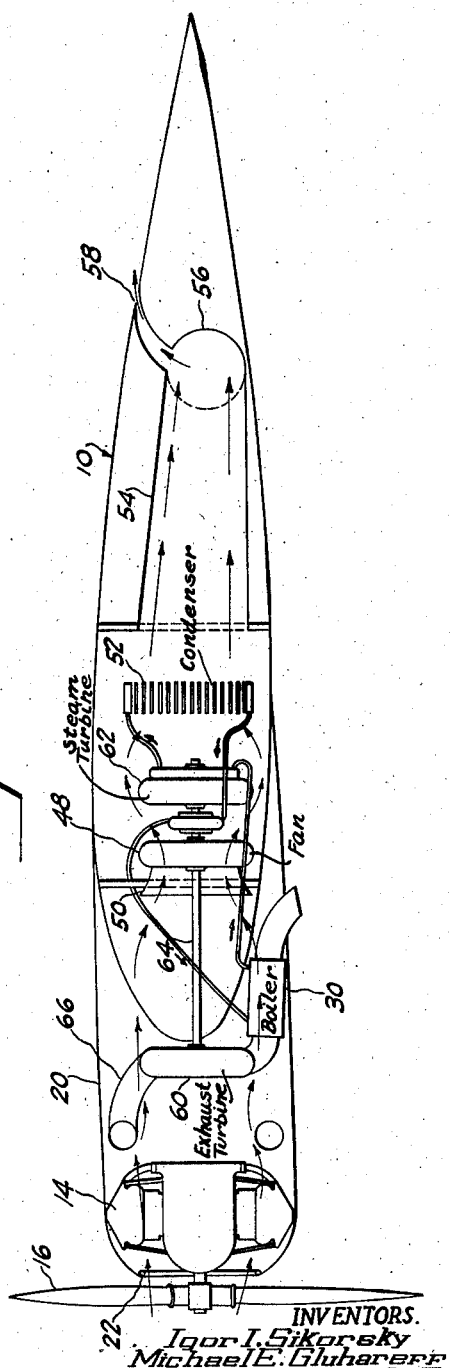

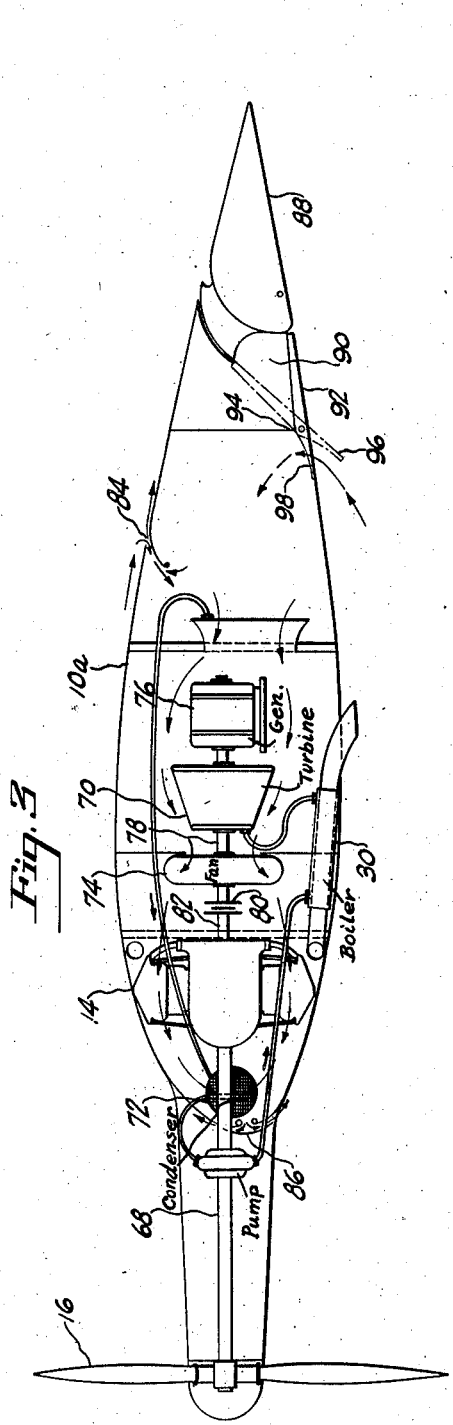
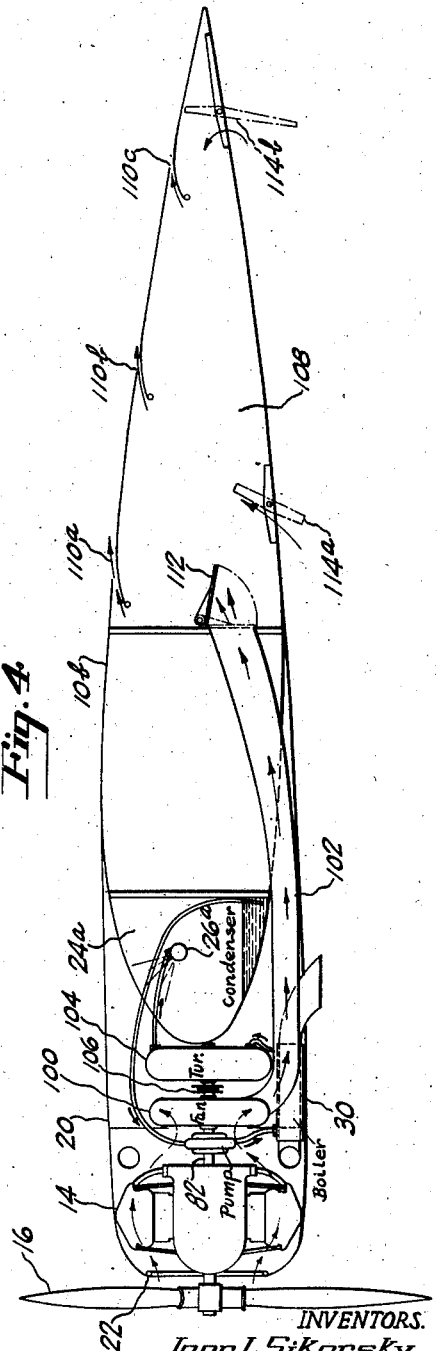

2,252,528

UNITED STATES PATENT OFFICE 2,252,528

AIRCRAFT

Igor I. Sikorsky, Trumbull, Michael E. Gluhareff, Stratford, and Roger W. Griswold, II, Old Lyme, Conn., assignors to United Aircraft Corporation, East Hartford, Conn., a corporation of Delaware Application July 16, 1938, Serial No. 219,490

4 Claims. (Cl. 244—53)

This invention relates to improvements in aircraft and has for an object the provision of improved aircraft engine cooling means effective to improve the aerodynamic characteristics of an aircraft sustaining airfoil.

A further object resides in the provision of means for conserving engine power by converting engine heat, which is ordinarily wasted, to useful purposes such as cooling the engine, increasing the efficiency of sustaining airfoils and supplying auxiliary power for various purposes.

A further object resides in the provision of means for aerodynamically improving the efficiency of sustaining airfoils during intervals when engine power or engine heat may not be available for that purpose.

Other objects and advantages will be more particularly pointed out hereinafter or will become apparent as the description proceeds.

In the accompanying drawings, in which like reference numerals are used to designate similar parts throughout, there is schematically illustrated, by way of example, certain mechanical embodiments incorporating various features of the invention. The drawings, however, are for the purpose of illustration only and are not to be taken as in any way limiting the scope of the invention as set forth in the appended claims.

In the drawings,

Fig. 1 shows an engine and airfoil combination and an engine cooling system arranged to improve the aerodynamic efficiency of the airfoil.

Fig. 2 is a schematic view similar to Fig. 1 showing a different type of engine and a slight rearrangement of the engine cooling system.

Fig. 3 is a schematic view similar to Figs. 1 and 2 but showing a different arrangement of the engine, the airfoil and the engine cooling system and includes an aerodynamically energized and powered slot combination.

Fig. 4 is also a schematic illustration of an engine, an airfoil and an engine cooling system but showing a different arrangement of the cooling system from the arrangement illustrated in Figs. 1, 2 and 3 and showing means in addition to the cooling system for aerodynamically energizing the airfoil to increase its efficiency.

Referring to the drawings in detail and particularly to Figs. 1 and 2, the numeral 10 generally indicates an airfoil such as the wing of an airplane. A propeller driving engine, as indicated at 12 in Fig. 1, or 14 in Fig. 2, may be carried either by the airfoil itself or by a suitable engine support secured to the aircraft in some convenient location. In Figs. 1 and 2 two different types of aircraft engines have been illustrated, both, however, well known to the art. The engine 12 in Fig. 1 has been shown as a liquid-cooled type of engine in which the heat is carried away from the neighborhood of the engine combustion chambers by means of liquid circulating in jackets disposed about the engine cylinders, while the engine 14 in Fig. 2 has been illustrated as an air-cooled engine in which excess heat is removed from the neighborhood of the combustion chambers of the engine by a stream of air flowing along finned surfaces on the engine cylinders. Each engine drives a suitable air propeller, as indicated at 16, and is enclosed in a streamlined cowling, as indicated at 18 in Fig. 1, and 20 in Fig. 2. The cowling 18 of the liquid-cooled engine may be somewhat more perfectly streamlined than the cowling of the air-cooled engine and may be tapered to a smaller frontal area. In the case of the air-cooled engine the streamlining is affected by the necessarily large engine diameter and the necessity of supplying an adequate amount of cooling air to the engine, which last mentioned necessity requires the provision of a cooling air entrance opening somewhere in the cowl, such as the opening 22 in the front end of the cowl 20.

In the case of the liquid-cooled engine 12 all of the excess engine heat, except the heat of the exhaust gases, is transferred to the cooling liquid and may be dissipated by passing the liquid through suitable radiators or condensers. As shown in Fig. 1, the greater part of the engine heat is dissipated in the surface radiator 24, located in the leading edge of the airfoil 10. The cooling liquid is conducted from the engine to a tube 26, disposed interiorly of the spanwise leading-edge tank. From this tube the liquid is sprayed against the inner surface of the tank which is also the inner surface of the covering of the leading edge of the wing. The heat is transferred from the liquid through the wing cover and is carried away by the air flow over the leading edge of the wing and the cooled liquid collects in the bottom of the tank 24 and is returned to the engine. If the leading edge surface radiator 24 is inadequate to cool the cooling fluid under all operating conditions, additional cooling may be provided by conducting the fluid from the tank 24 and passing it through an auxiliary radiator or condenser such as is indicated at 28. Certain material advantages may be obtained by locating the condenser 28 in the upper portion of the wing with its surface flush with the upper surface of the wing and extending the surface in a spanwise direction along the wing. However, when the condenser is so mounted with its outer surface flush with the wing surface, some auxiliary means will be required to provide a sufficient flow of cooling air through the condenser to cool the cooling fluid. This auxiliary means may be operated without detracting from the power output of the engine by utilizing the ordinarily wasted heat of the engine exhaust gases. A boiler 30 is operatively associated with the exhaust gas collector 32 and is operatively connected with the intake of a steam engine or turbine 34. The exhaust of the turbine 34 may conveniently be carried to the condenser 28 and from the condenser, the condensed liquid will be returned to a suitable storage tank or directly to the boiler 30 in a manner well known to the art. If desired the condenser 28 may be provided with separate sections for cooling or condensing the cooling fluid and the steam from the exhaust of the turbine 34. The turbine 34 drives an air pump or fan 36 which forces air into the interior of the airfoil through the condenser 28 by applying suction to the spanwise conduit 38 through the duct 40, and forcing the same air out of the wing through the duct 42 connected with the spanwise conduit 44 and the slot 46.

This arrangement provides a rearwardly directed high velocity air jet along the forward portion of the wing or airfoil, and an air suction or intake along the rearward portion of the upper surface of the airfoil. The jet through the slot, and the suction through the condenser, will act respectively to energize and remove the boundary layer of air over the upper surface of the airfoil between the slot and the condenser thereby overcoming to a considerable extent the adverse effects due to skin friction and the viscosity of the air flowing along this surface, with a consequent increase in lift and decrease in drag of the affected portion of the surface. With the above described cooling arrangement the efficiency of the airfoil is greatly increased and the increase in efficiency is accomplished at no material expense of engine power and, since the power ordinarily diverted to cool the engine is, in this case, developed by other means, substantially the full power of the engine may be converted into propulsive effort of the engine driven propeller.

If the aircraft is equipped with more than one engine, each engine may be provided with a cooling arrangement of the type illustrated, or two or more engines may be cooled by the same cooling device as may be desirable or expedient.

In the arrangement shown in Fig. 2 the air for cooling the air cooled engine 14 may be drawn into the engine cowl 20 through the aperture 22 by the operation of the fan or air pump 48. After passing through the engine and removing the excess heat therefrom, the cooling air may be led into the leading edge of the wing and, if desired, may be forced along the interior of the leading edge in a spanwise direction to impart a portion of the heat to the forward portion of the wing to prevent the formation of ice thereon. The air is withdrawn from the forward portion of the wing through the fan duct 50 and is forced rearwardly through the condenser 52 and duct 54 to the spanwise conduit 56 from which it flows through the rearwardly directed, spanwise slot 58, located in the rearward portion of the upper surface of the wing or airfoil 10. The fan 48 may be driven by an exhaust turbine 60 and a steam turbine 62 operating together to rotate the drive shaft 64. The exhaust 60 is connected into the exhaust conduit 66 and driven directly by the exhaust gases while the steam turbine 62 is driven by steam supplied from a boiler 30 operatively associated with the exhaust gas conduit. The intake of the turbine 62 is connected by suitable means with the boiler 30 and the turbine exhaust is connected with the condenser 52. From the condenser 52 the condensed liquid is returned to the boiler either directly or through a suitable storage tank, not illustrated. With this arrangement practically all of the available heat in the exhaust gases is converted into mechanical energy, which energy is reconverted into power for cooling the engine and for increasing the efficiency of the wing. Obviously since the shaft 64 is not in any way connected with the engine, no large amount of engine power will be diverted to rotate the fan but all of the power of the engine, except any slight loss due to increased pressure on the exhaust, may be converted into propulsive effort of the propeller 16. The power for cooling the engine is derived mainly from the ordinarily wasted heat of the engine exhaust gases and, after cooling the engine, this power is utilized to increase the efficiency of the sustaining airfoil. In this case the jet of air forced at high velocity from the rearwardly directed spanwise slot 58 adds its velocity energy to the air flowing along the rearward portion of the upper surface of the airfoil. By thus increasing the velocity of the air flow along the rearward portion of the upper surface of the airfoil, the area of diminished pressure over the upper surface of the airfoil may be increased and any tendency of the airflow to break away from the surface near the trailing edge of the airfoil may be materially delayed. Thus the proportion of the potential energy of the fuel supplied to the engine which is converted into useful work may be greatly increased, permitting a great improvement in the ratio of the size and weight of the power plant to the speed and load carrying ability of the aircraft.

In the arrangement illustrated in Fig. 3 the engine 14 is itself disposed in the forward portion of a relatively thick airfoil 10a and drives the propeller 16, positioned ahead of the airfoil, through the extension shaft 68. In this case the steam boiler 30 supplies steam, generated by the heat of the engine exhaust gases, to a relatively large and efficient steam turbine 70 which exhausts to a condenser 72 located in the interior of the leading edge portion of the airfoil. The generator 70 drives the fan 74 and the electrical generator 76. The fan supplies the necessary velocity to the engine cooling air and the generator supplies power for the accessory devices with which the aircraft is equipped. The turbine 70, the fan 74 and the generator 76 may have a common drive shaft 78 and a clutch 80, either manually or automatically actuated may be interposed between this shaft and the engine accessory drive 82 so that the shaft 78 may be operatively connected with the engine under certain conditions. If for any reason insufficient steam is generated by the boiler 30 to operate the turbine 70 at the power required, the power deficiency may be made up by the engine so that the engine will be properly cooled and adequate power provided for the aircraft accessories. Even though the power transmitted to the propeller be slightly reduced this need not be a disadvantage since engine power would in general be necessary to operate the fan and generator only where the engine was operating at a reduced or idling speed. Alternatively if the turbine 70 generates an excess of power over that required to drive the fan and generator, this extra power may be added, through the clutch 80, to the power developed by the engine 14, to either increase the power of the aircraft or improve the economy of the engine.

The flow of cooling air past the engine is reversed in direction, from the usual direction as shown in Fig. 2, the air being drawn in through the slot 84 located in the rearward portion of the upper surface of the airfoil and ejected first through the condenser 72 and then through the double slot 86 along the leading edge of the airfoil. The flow of cooling air first cools and ventilates the generator 76, then passes through the fan 74 and is forced by the fan past the cooling surfaces of the engine 14. The air warmed by the engine, is then forced through the steam condenser 72 in the leading edge of the airfoil and the hot air from the condenser is exhausted through the double leading edge slot 86. The condenser and the hot air exit slot located along the leading edge of the airfoil will effectively prevent the formation of ice on the leading edge of the wing. The slot 86 also directs the engine cooling air at a high velocity along the airflow surfaces thereby adding velocity energy to the boundary layer of air which tends to stick to the surfaces of the airfoil, thereby reducing the detrimental drag effects of the viscosity of the air through which the airfoil passes and greatly increasing the aerodynamic efficiency of the airfoil. The suction slot 84, located in the rearward portion of the upper surface of the airfoil, also has a beneficial effect in continuously removing the boundary layer from the adjacent surfaces of the airfoil.

In the construction schematically illustrated in Fig. 3, provision has also been made for aerodynamically energizing the boundary layer in case the engine cooling arrangement should, for any reason, become ineffective for that purpose. As illustrated, the airfoil is provided with a lift increasing device 88 a suitable form of which is particularly illustrated and described in Patent No. 2,117,607, issued May 17, 1938, to Roger W. Griswold, II, for Slotted deflector flap. The slot 90 between the relatively movable flap 88 and the relatively fixed portion of the wing or airfoil is provided at its lower end with a door 92, movable between two operative positions, as illustrated in full lines and in broken lines in Fig. 3. This door is pivoted at 94 and is provided with an overhang 96 which provides, when the door is in the operative position shown in broken lines, a scoop, for forcing air through a slot 98 in the lower surface of the airfoil, which slot is ordinarily closed by the overhang 96. The air forced into the airfoil when the door 92 is in its open position leaves the interior of the airfoil through the slots 84 and 86, producing rearwardly directed high velocity air jets at the exits of these slots. These air jets add their velocity energy to the layer of air immediately in contact with the airfoil surfaces and thereby improve the aerodynamic efficiency of the airfoil in the manner indicated above. Thus, with the arrangement illustrated in Fig. 3, the boundary layer of air along the airfoil surfaces may be energized, either mechanically by the engine cooling apparatus, or aerodynamically by providing an air scoop to modify the flow of air along the surfaces of the airfoil.

In the arrangement schematically illustrated in Fig. 4 the engine 14 is carried ahead of the airfoil 10b and is enclosed in a streamlined cowling 20 provided in the front end thereof, with a cooling air inlet aperture 22. In this case the cooling air fan 100 is carried upon the engine accessory drive 82 so that it is at all times driven by the engine to force the engine cooling air into the inlet opening 22, past the engine cooling surfaces to the fan, and from the fan exhaust through the duct 102. The exhaust powered steam boiler 30 is connected with the inlet of the steam turbine 104 which is independently mounted and connectible with the fan 100 by means of the clutch 106. The turbine exhaust leads to the condenser 24a, in the form of a leading edge surface radiator. In this condenser the steam is led in through the tube 26a, which tube is provided with perforations to direct the steam in jets against the inner surface of the leading edge cover. The condensate collects in the lower portion of the leading edge space and from there is returned to the boiler 30. The duct 102 leads through the forward portion of the wing to a rear compartment 108 provided with a plurality of spanwise air exit slots 110a, 110b and 110c in the rearward portion of the upper surface of the airfoil. The end of the duct 102 in the compartment 108 is provided with a flap valve 112 which, while permitting a flow of air through the duct to the rear compartment prevents a reverse flow of air from the compartment through the duct to the engine compartment. The lower surface of the rear compartment 108 is provided with a plurality of pivoted door members, as indicated at 114a and 114b. These door members extend in a spanwise direction along the lower surface of the airfoil and are pivoted intermediate their width so that when opened, as indicated in broken lines, they constitute scoops for forcing air through apertures opened in the lower airfoil surface when the doors are moved in their open position, in addition to their function as lower surface high-lift flaps. When the engine is operating, the engine cooling air is forced through the duct 102 to the interior of the compartment 108 and out through the spanwise rearwardly directed slots 110a, b and c thus energizing the boundary layer in contact with the upper surface of the airfoil and improving the aerodynamic efficiency of the airfoil. This flow of cooling air will be maintained at all times during operation of the engine 14 since the fan 100 is driven directly by the engine. In order to conserve the power of the engine, the steam turbine 104 driven by steam generated by the exhaust fired boiler 30 may be coupled to the fan shaft through the medium of the clutch 106 to add its power to the power developed by the engine to compensate for the power required to operate the fan 100, and to add any excess power to the power transmitted to the propeller 16. Whenever the flow of engine cooling air is discontinued, the air flow may be aerodynamically energized by opening the doors 114a and 114b thereby utilizing the pressure differential between the upper and lower surfaces of the airfoil to force air jets through the slots 110a, b and c.

In all of the modifications illustrated the energization of the boundary layer is preferably maintained at all times since such energization materially increases the aerodynamic efficiency of the sustaining airfoil and permits the carrying of greater loads with less power than is possible at present, or renders it possible to carry the same load at a greater speed than is possible without such energization. It is obvious that such a provision is highly important in the design of long range aircraft wherein the matter of fuel economy is a major consideration. The provision for aerodynamic energization of the boundary layer, in addition to the energization thereof by the engine cooling apparatus, is highly important in that it will provide for the safe landing of an airplane at excessively high wing loading when the engines are idling or inoperative.

Two highly important features of the invention are, the utilization of the energy of the engine exhaust gases for operating the engine cooling means and, in some cases furnishing power for the accessories of the airplane or adding power to the power transmitted by the engine to the propeller, and the improvement of the aerodynamic efficiency of the sustaining airfoil boundary layer by imparting thereto the velocity energy acquired by the cooling air in cooling the engine. By such an arrangement the efficiency of both the engine and sustaining airfoil is materially improved thereby permitting simultaneous improvement in the fuel economy and performance of the airplane. The provision for aerodynamically energizing the boundary layer of the airfoil is also important from a practical viewpoint in that it permits safe operation of the aircraft when the engine power is reduced either by engine failure or from the necessity of reducing the engine power for landing.

While the invention has been schematically illustrated in several forms for the purposes of this disclosure, it is to be understood that the various modifications so illustrated are by way of example only and that such changes in the size, shape and arrangement of the various elements may be resorted to as come within the scope of the appended claims.

Having now described the invention so that others skilled in the art may clearly understand the same, what is claimed and what it is desired to secure by Letters Patent is as follows:

1. In an aircraft having an internal combustion engine and a sustaining airfoil, means for cooling said engine and improving the aerodynamic efficiency of said airfoil comprising, a fan in said airfoil for providing a flow of engine cooling air, and an exhaust fired steam driven turbine for operating said fan, a steam condenser located in said cooling air stream, and a rearwardly directed spanwise slot in the upper surface of said wing, pneumatically connected with said fan for discharging the engine cooling air in a rearwardly directed high velocity air jet along the upper surface of said airfoil.

2. In an aircraft having an internal combustion engine and a sustaining airfoil, means actuated by the heat of the engine exhaust gas for providing a flow of engine cooling air, and a clutch between said flow providing means and said engine for transmitting excess power developed by said exhaust gas heat actuated means to the engine to add to the power delivered by the engine.

3. In an aircraft having an internal combustion engine, means for converting the heat of the exhaust gas of said engine into steam, a turbine for converting the heat energy of said steam into mechanical energy, and means for utilizing a portion of the heat energy of exhaust steam from said turbine for heating the interior of said aircraft.

4. In an aircraft having an internal combustion engine, means for converting the heat of the exhaust gas of said engine into steam, a steam turbine, an electric current generator driven by said turbine, and means for utilizing a portion of the output of said generator to heat the interior of said aircraft.

IGOR I. SIKORSKY.
M. E. GLUHAREFF.
ROGER W. GRISWOLD, II.